United States Patent
Sadaki et al.

(10) Patent No.: US 11,453,203 B2
(45) Date of Patent: Sep. 27, 2022

(54) ROLL-BONDED LAMINATE AND METHOD FOR PRODUCING THE SAME

(71) Applicant: Toyo Kohan Co., Ltd., Tokyo (JP)

(72) Inventors: Kota Sadaki, Kudamatsu (JP); Teppei Kurokawa, Kudamatsu (JP); Yusuke Hashimoto, Kudamatsu (JP); Takafumi Hatakeda, Kudamatsu (JP)

(73) Assignee: TOYO KOHAN CO., LTD.

( * ) Notice: Subject to any disclaimer, the term of this patent is extended or adjusted under 35 U.S.C. 154(b) by 0 days.

(21) Appl. No.: 16/483,623

(22) PCT Filed: Feb. 7, 2018

(86) PCT No.: PCT/JP2018/004105
§ 371 (c)(1),
(2) Date: Aug. 5, 2019

(87) PCT Pub. No.: WO2018/147297
PCT Pub. Date: Aug. 16, 2018

(65) Prior Publication Data
US 2020/0031096 A1  Jan. 30, 2020

(30) Foreign Application Priority Data

Feb. 7, 2017  (JP) .............. JP2017-020551

(51) Int. Cl.
*B32B 15/01* (2006.01)
*B21B 1/22* (2006.01)
*B23K 20/04* (2006.01)

(52) U.S. Cl.
CPC .............. *B32B 15/015* (2013.01); *B21B 1/22* (2013.01); *B23K 20/04* (2013.01); *B32B 2307/732* (2013.01)

(58) Field of Classification Search
CPC ... B32B 15/015; B32B 2307/732; B21B 1/22; B23K 20/04
(Continued)

(56) References Cited

U.S. PATENT DOCUMENTS 4,831,708 A * 5/1989 Yoshiwara ............. B23K 20/04
228/158
2004/0065717 A1  4/2004 Saijo et al.
(Continued)

FOREIGN PATENT DOCUMENTS

CN  102917870  2/2013
CN  105170652  12/2015
(Continued)

OTHER PUBLICATIONS

EIKI, JP 3862737 B1 machine translation, Dec. 27, 2006, entire machine translation (Year: 2006).*
(Continued)

*Primary Examiner* — Humera N. Sheikh
*Assistant Examiner* — Katherine A Christy
(74) *Attorney, Agent, or Firm* — McCarter & English, LLP

(57) ABSTRACT

This invention provides a metal laminate that maintains functionality such as radiation performance and is excellent in dimensional accuracy after press work. Such metal laminate is a roll-bonded laminate composed of 2 or more metal layers, which exhibits a ratio σ/T of the standard deviation σ of thickness $T_1$ of the outermost layer to thickness T of the roll-bonded laminate of 0% of 4.0%, the thickness T of 2 mm or less, and the deviation of the thickness T of 4.0% or less.

11 Claims, 7 Drawing Sheets

(58) Field of Classification Search
USPC .......................................................... 428/638
See application file for complete search history.

(56) References Cited

U.S. PATENT DOCUMENTS

| | | | |
|---|---|---|---|
| 2013/0209874 A1 | 8/2013 | Yoshida et al. | |
| 2014/0339288 A1 | 11/2014 | Otaki | |
| 2015/0190985 A1* | 7/2015 | Oda | B23K 20/04 428/677 |
| 2015/0351236 A1* | 12/2015 | Kato | B32B 37/1018 174/258 |
| 2017/0014942 A1 | 1/2017 | Nanbu et al. | |

FOREIGN PATENT DOCUMENTS

| | | | |
|---|---|---|---|
| JP | 3168930 | | 5/2001 |
| JP | 3862737 B1 * | 12/2006 | H01L 23/3735 |
| JP | 5410646 | | 2/2014 |
| JP | 2014223657 | | 12/2014 |
| WO | 200232660 | | 4/2002 |
| WO | 2011152478 | | 12/2011 |
| WO | 2015152040 | | 10/2015 |

OTHER PUBLICATIONS

International Search Report based on co-pending International Application No. PCT/JP2018/004105, dated May 1, 2018—2 Pages.
Office Action relating to co-pending Chinese Application No. 201880009902.8 dated May 15, 2020—6 Pages.
Woodford, Chris, "Alloys—What are they? What are common alloys made from?" (Oct. 12, 2020) https://www.explainthatstuff.com/alloys.html.

* cited by examiner

ROLL-BONDED LAMINATE AND METHOD FOR PRODUCING THE SAME

CROSS-REFERENCE TO RELATED APPLICATIONS

This application is a national stage application filed under 35 USC 371 of International Patent Application No. PCT/JP2018/004105, filed Feb. 7, 2018, which claims the benefit of Japanese Patent Application No. 2017-020551, filed Feb. 7, 2017, each of which is incorporated herein, in its entirety, by reference.

TECHNICAL FIELD

The present invention relates to a roll-bonded laminate and a method for producing the same. The present invention further relates to a molded product prepared from such roll-bonded laminate.

BACKGROUND ART

Metallic materials are used in a wide variety of fields. For example, metallic materials are used as interior-protecting members, such as a shield cover for an integrated circuit of electronic equipment such as mobile electronic equipment. Such metallic materials are required to exhibit high strength and moldability. As such metallic materials, stainless steel has been extensively used. As other metallic materials, roll-bonded laminates (e.g., metal laminated materials or clad materials) comprising two or more types of metal plates or metal foils laminated on top of each other are known. A roll-bonded laminate is a sophisticated metallic material with multiple properties that cannot be achieved by a single material. For example, a roll-bonded laminate composed of stainless steel and copper superposed on top of the other aimed at improved thermal conductivity has been studied.

As conventional roll-bonded laminates, for example, the roll-bonded laminates disclosed in Patent Documents 1 and 2 are known. Patent Document 1 discloses a chassis made of a clad material in which a first layer made of austenite stainless steel, a second layer made of Cu or a Cu alloy stacked on the first layer, and a third layer made of austenite stainless steel stacked on a side of the second layer opposite from the first layer are roll-bonded to each other, wherein a thickness of the second layer is at least 15% of a thickness of the clad material and a method for producing the same.

Also, Patent Document 2 discloses a method for producing a Cu-stainless steel clad plate in which a Cu plate and a stainless steel plate subjected to brushing treatment are superposed on top of each other, the superposed plates are roll-bonded to each other via cold rolling at a reduction ratio of 2% to 10% to prepare a clad plate, and the clad plate is then heated to 500° C. to 1050° C. in vacuum at $10^{-4}$ Torr or lower.

PRIOR ART DOCUMENTS

Patent Documents

Patent Document 1 JP Patent No. 5,410,646
Patent Document 2 JP Patent No. 3,168,930

SUMMARY OF THE INVENTION

Objects to be Attained by the Invention

When a roll-bonded laminate of copper and stainless steel is produced as disclosed in Patent Document 1, thickness of the laminate can be reduced by repeating rolling and heat treatment. In the step of rolling, however, the copper-stainless steel interface smoothness is deteriorated. When various types of molded products are produced from roll-bonded laminates via press work, in addition, dimensional accuracy is poor.

While rolling is performed at a low reduction ratio in Patent Document 2, adhesiveness is achieved by subjecting the interface to brushing to form concave and convex curves. Accordingly, the copper-stainless steel interface smoothness is poor. As with the case of the roll-bonded laminate of Patent Document 1, dimensional accuracy after press work is poor.

Because of an increase in the speed of integrated circuits of recent years, reinforcement of heat conductivity and radiation performance of the roll-bonded laminate has been desired. In addition, a larger capacity of a secondary cell is desired because of a prolonged operating time of mobile electronic equipment and the like, and space conservation is desired because of the increased number of components required by increased and sophisticated functionalities. To this end, reduction in thickness of the roll-bonded laminate and complication of a configuration of an applicable member advance. Thus, a further improvement in dimensional accuracy is desired after press work.

Under the above circumstances, the present invention is intended to provide a roll-bonded laminate that is excellent in dimensional accuracy after press work while maintaining functionality such as radiation performance and a method for producing such laminate.

Means for Attaining the Objects

The present inventors have conducted concentrated studies in order to attain the above object. As a result, they discovered that dimensional accuracy of the roll-bonded laminate after press work depends on thickness accuracy of each metal layer constituting the roll-bonded laminate and that high dimensional accuracy would be achieved after press work by regulating such thickness accuracy within a particular range. This has led to the completion of the present invention. Specifically, the present invention is summarized as follows.

(1) A roll-bonded laminate composed of 2 or more metal layers, wherein the ratio $\sigma/T$ of the standard deviation $\sigma$ of outermost layer thicknesses to thickness T of the roll-bonded laminate is 0% to 4.0%, the thickness T is 2 mm or less, and the deviation of the thickness T is 4.0% or less.

(2) The roll-bonded laminate according to (1), wherein the standard deviation $\sigma$ of outermost layer thicknesses is less than 4.0 µm.

(3) The roll-bonded laminate according to (1) or (2), wherein the 2 or more metal layers are each independently composed of a metal selected from the group consisting of Al, Cu, Mg, Fe, and Ti or an alloy thereof.

(4) A method for producing the roll-bonded laminate according to (1) comprising a step of bonding the 2 or more metal layers to each other so as to adjust a change in Vickers hardness (JIS Z 2244; load 50 gf) of the hardest metal layer among the 2 or more metal layers before and after bonding within 80, wherein the ratio $\Delta T/T_0$ of a reduction $\Delta T$ to the total thickness $T_0$ of the 2 or more metal layers before bonding is less than 1.0.

(5) The method for producing the roll-bonded laminate according to (4), wherein the step of bonding 2 or more metal layers to each other is performed by subjecting the metal layer surfaces to be bonded to each other to sputter etching and roll-bonding the surfaces subjected to sputter etching.

(6) A molded product comprising the roll-bonded laminate according to any of (1) to (3).

This description includes part or all of the content as disclosed in Japanese Patent Application No. 2017-020551, which is a priority document of the present application.

Advantageous Effects of the Invention

According to the present invention, a roll-bonded laminate that has excellent dimensional accuracy after press work while maintaining functionality such as radiation performance can be obtained. With the utilization of high dimensional accuracy, such roll-bonded laminate can be preferably used as a functional member, such as a cover, reinforcement member, or radiation/electromagnetic shielding material of mobile electronic equipment.

EMBODIMENTS FOR CARRYING OUT THE INVENTION

Figure 1:
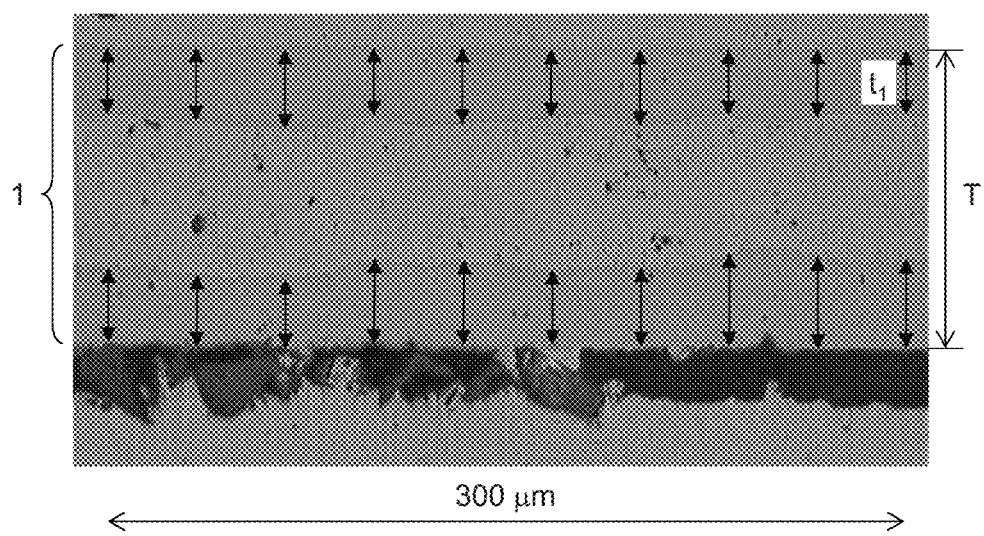
FIG. 1 shows an optical microscopic photograph (1000×) of a cross section of the roll-bonded laminate according to the present embodiment (a tri-layer structure of SUS/Cu/SUS).

Hereafter, the present invention is described in detail with reference to embodiments.

The roll-bonded laminate according to the present embodiment is composed of 2 or more metal layers, preferably 2 to 4 layers, and particularly preferably 3 layers. Materials constituting metal layers can be adequately selected in accordance with, for example, applications of the roll-bonded laminate without particular limitation. For example, each metal layer can be composed of a metal selected from the group consisting of Al, Cu, Mg, Fe, and Ti or an alloy thereof. Examples of alloys include SUS304, SUS316, Ti alloy, Cu alloy, aluminum alloys such as A5052, and magnesium alloys such as AZ31, AZ61, AZ91, and LZ91. In particular, a roll-bonded laminate composed of 3 layers such as SUS/Cu/SUS, SUS/Al/SUS, or Al/SUS/Al or a roll-bonded laminate composed of 2 layers such as SUS/Cu, SUS/Al, SUS/Al alloy, or Cu/Al alloy can be preferably used as a roll-bonded laminate with strength of stainless steel, and heat conductivity and radiation performance of copper, aluminum, or aluminum alloy. In addition, a roll-bonded laminate composed of 2 layers such as Ti/Al alloy or Ti alloy/Al alloy is preferably used.

As a metal layer to be bonded, a metal plate or foil can be used. In the case of a single type of metal plate or foil such as aluminum or copper, for example, a metal with high purity is preferable when higher heat conductivity is intended, although it depends on an application of the roll-bonded laminate. Specifically, purity is 99.5 mass % or higher, although the purity is not limited thereto.

In general, thickness of a metal layer of a plate or foil to be bonded is at least 0.01 mm. From the viewpoint of mechanical strength and workability of the resulting roll-bonded laminate, such thickness is preferably 0.01 mm to 1.8 mm. From the viewpoint of ease of handling, thickness is preferably 0.015 mm or more. From the viewpoint of weight reduction and thickness reduction of the roll-bonded laminate, in addition, metal layer thickness is more preferably 1.2 mm or less, further preferably 0.8 mm or less, and particularly preferably 0.5 mm or less before bonding. Thickness of the roll-bonded laminate can be reduced by further subjecting the roll-bonded laminate to rolling after bonding. Accordingly, metal layer thickness before bonding is not limited thereto. Metal layer thickness before bonding can be measured with the use of, for example, a micrometer, and such thickness is determined by measuring thickness at randomly selected 10 points on the target metal layer surface and calculating the average thereof. Concerning the plate or foil to be used, a deviation from the average of values measured at 10 points is preferably within 10%. When a thin foil with thickness of less than 1 mm is used as a metal layer to be bonded, in particular, performance such as radiation performance may vary when a deviation is large. Thus, a smaller deviation is preferable.

Concerning the roll-bonded laminate according to the present embodiment, the ratio $\sigma/T$ of the standard deviation $\sigma$ of outermost layer thicknesses to thickness T of the roll-bonded laminate is 0% to 4.0%. Such ratio $\sigma/T$ is more preferably 0% to 1.2%, further preferably 0% to 0.9%, and particularly preferably 0% to 0.7%. In addition, a deviation of thickness T is required to be 4.0% or less, more preferably 3.0% or less, further preferably 2.5% or less, and particularly preferably 2.0% or less. In particular, the standard deviation $\sigma$ is preferably less than 4.0 µm, and the standard deviation $\sigma$ is more preferably less than 1.8 µm. When thickness T of the roll-bonded laminate is excessively small, the laminate becomes difficult to handle. When thickness T is excessively large, in contrast, the weight of the roll-bonded laminate is increased, and continuous reel-to-reel production may become difficult. On the basis of the balance between such properties, accordingly, adequate thickness is determined. Specifically, thickness T is 2 mm or less, more preferably 1 mm or less, further preferably 0.5 mm or less, and particularly preferably 0.2 mm or less.

The standard deviation $\sigma$ of outermost layer thicknesses is determined by obtaining an optical microscopic photograph of a cross section of the roll-bonded laminate 1, measuring thickness $T_1$ of the outermost metal layer at 10 points at equal intervals on the cross section over a width of 300 µm in the optical microscopic photograph, and calculating the standard deviation thereof. Also, thickness T of the roll-bonded laminate 1 is determined by measuring thickness at arbitrary 30 points on the roll-bonded laminate 1 using a micrometer, and calculating the average thereof. A deviation of thickness T is determined by the formula: $|T_i-T|/T \times 100$ (%), provided that the thickness measured at the 30 points is each designated as $T_i$ (i=1, 2 ... 30).

In addition to the thickness of the outermost metal layer, thickness of each metal layer in the form of the roll-bonded laminate after bonding can be measured on the basis of the optical microscopic photograph of the cross section of the roll-bonded laminate 1, as described above. Specifically, each metal layer thickness is measured at 10 points at equal intervals on the cross section over a width of 300 μm in the optical microscopic photograph, and the average thereof is designated as the metal layer thickness. Each metal layer thickness of the roll-bonded laminate may be generally 0.01 mm or more. From the viewpoint of mechanical strength and workability of the roll-bonded laminate, thickness is preferably 0.01 mm to 1.8 mm. From the viewpoint of weight reduction and thickness reduction of the roll-bonded laminate, each metal layer thickness is more preferably 1.2 mm or less, further preferably 0.8 mm or less, and particularly preferably 0.5 mm or less.

By adjusting the ratio σ/T of the standard deviation σ to thickness T of the roll-bonded laminate to 0% to 4.0%, thickness T to 2 mm or less, and a deviation of thickness T to 4.0% or less, high dimensional accuracy can be maintained after the roll-bonded laminate is subjected to press work. When a roll-bonded laminate is subjected to plastic deformation to a given angle, specifically, variation in an extent of the spring back phenomenon such that the laminate is released from the given angle because of elasticity can be reduced to a significant extent. It was not known in the past that dimensional accuracy after press work depends on thickness accuracy of metal layers constituting the roll-bonded laminate and that, in particular, influence of thickness accuracy of metal layers of the thin roll-bonded laminate as described above on dimensional accuracy after press work was significant. Such features were discovered in the present invention.

Concerning dimensional accuracy, for example, JIS B 0408-1991 specifies as follows concerning the general dimensional tolerances for a metal press mold product. That is, when the standard dimension is 6 mm to less than 30 mm, a product is evaluated as Grade B when a deviation from the standard dimension is ±0.5 mm, and a product is evaluated as Grade C when it is ±1 mm. Calculation is performed by bending a 60-mm-long specimen at the center thereof at 60 degrees by the V block method described below, designating the length of a half of the specimen as 30 mm, and presuming the average bent angle to be 60 degrees. When a bent angle of the specimen is deviated by ±1 degree, accordingly, the distance between the split parts varies by ±0.46 mm. When deviated by ±1.1 degrees, the distance between the split parts varies by ±0.5 mm. When deviated by ±1.4 degrees, the distance between the split parts varies by ±0.64 mm. According to the present invention, as described in the examples below, the roll-bonded laminate can be qualified as Grade C as specified by the JIS standard as described above by adjusting σ/T of the roll-bonded laminate to 0% to 4.0%. By adjusting σ/T to 0% to 1.2%, in addition, the standard deviation of the finish angle can be reduced to a significant extent. Thus, the roll-bonded laminate can satisfy Grade B specified with reference to JIS as described above. It should be noted that a standard dimension is merely an example, and the present invention is not limited thereto.

On the surface of the metal layer opposite from the interface of the roll-bonded laminate 1, according to need, a protective layer can be provided for the purpose of anti-corrosion, oxidation prevention, discoloration prevention, or other purposes while refraining from blocking performance, such as thermal conductivity and radiation performance. Examples of protective layers for a metal layer composed of a copper include a chemically-treated layer and an Ni-plated layer. Examples of protective layers for a metal layer composed of a magnesium alloy include chemically treated layers, such as layers subjected to treatment with phosphoric acid, chromate treatment, and anodic oxidation.

Subsequently, a method for producing a roll-bonded laminate is described. The roll-bonded laminate according to the present embodiment can be produced by preparing metal layers such as plates or foils and subjecting such layers to various techniques, such as cold roll bonding, hot roll bonding, or surface-activated bonding to bond them to each other. In such a case, 2 or more metal layers are bonded to each other in a manner such that a change in Vickers hardness of the hardest metal layer before and after bonding is adjusted within 80 and the ratio $\Delta T/T_0$ of a rolling reduction $\Delta T$ relative to the total thickness $T_0$ of the 2 or more metal layers before bonding is adjusted to less than 1.0. It is particularly preferable that bonding be carried out to adjust the ratio $\Delta T/T_0$ of a rolling reduction $\Delta T$ relative to the total thickness $T_0$ to less than 0.7. Thus, a roll-bonded laminate that satisfies the conditions such that the standard deviation σ of outermost layer thicknesses/thickness T ratio σ/T is 0% to 4.0% and a deviation of thickness T is within 4.0% can be obtained, and dimensional accuracy after press work can be improved. The "hardest" metal layer exhibits the highest Vickers hardness (JIS Z 2244; load: 50 gf) among the metal layers to be bonded to each other. After bonding, Vickers hardness of each metal layer is measured in the form of the resulting roll-bonded laminate, and Vickers hardness of a metal layer between layers constituting the roll-bonded laminate composed of 3 or more layers is measured when the intermediary metal layer is exposed on the surface during the process of roll-bonded laminate production.

In the case of cold roll bonding, bonding is preferably followed by stabilizing heat treatment. According to hot roll bonding, layers are roll-bonded to each other while applying heat at a temperature equivalent to or higher than the recrystallization temperature for the laminate. Compared with cold roll bonding, layers can be bonded to each other at a lower force, although an intermetallic compound is likely to be generated at the bonding interface. In order to prevent an intermetallic compound from being generated, accordingly, heating temperature, a heating duration, and other conditions should be adequately selected.

A preferable embodiment of a method for producing the roll-bonded laminate 1 is as described below. At the outset, surfaces of the metal layers to be bonded to each other are subjected to sputter etching, and the surfaces subjected to sputter etching are then roll-bonded to each other to produce a bi-layer roll-bonded laminate (surface-activated bonding). A roll-bonded laminate composed of 3 or more layers can be produced by repeating the steps described above to roll-bond other metal layers. According to such technique, a rolling reduction can be reduced to several % or lower, the bonding interface is sufficiently smooth, and metal layer thickness accuracy can be improved (i.e., a variation in thickness is small). Such technique is preferable because metal layers with low strength, such as layers of magnesium alloy, can be bonded to each other at room temperature without cracking.

For example, sputter etching is carried out by preparing metal layers to be bonded to each other in the form of long coils with a width of 100 mm to 600 mm, designating the bonding surface of the metal layer as a ground-connected electrode, applying an alternating current of 1 MHz to 50 MHz to a region between the electrode and the other insulated electrode to generate a glow discharge, and adjusting an area of the electrode exposed to the plasma generated by the glow discharge to one third or less of the area of the other electrode. During sputter-etching, the ground-connected electrode is in the form of a cooling roll, which prevents the transfer materials from temperature increase.

Sputter-etching treatment is intended to completely remove substances adsorbed to the surface and remove a part of or the entire oxide layer on the surface by subjecting the bonding surface of the metal layer to sputtering with inert gas in vacuum. When the metal layer is composed of magnesium alloy, in particular, it is not necessary to completely remove the oxide layer, and the metal layer can be sufficiently bonded in the presence of a remaining part of the oxide layer. In the presence of a remaining part of the oxide layer, the duration of the sputter-etching treatment is shortened to a significant extent, and productivity of a metal laminate is improved, compared with the case in which the oxide layer is completely removed. In contrast, it is preferable that an oxide layer on the copper surface be completely removed. Examples of inert gas that can be applied include argon, neon, xenon, krypton, and a mixed gas comprising at least one of the inert gases mentioned above. While the etching amount varies depending on a metal type, a substance adsorbed to the metal layer surface can be completely removed with the etching amount of about 1 nm, and the oxide layer can be generally removed with the etching amount of about 5 nm to 12 nm (in terms of $SiO_2$).

Sputter etching conditions can be adequately determined in accordance with, for example, a metal layer type. For example, sputter etching can be carried out in vacuum at a plasma output of 100 W to 10 kW and a line velocity of 0.5 m/min to 30 m/min. While a higher degree of vacuum is preferable in order to prevent a substance from being readsorbed to the surface, a degree of vacuum of, for example, $1\times10^{-5}$ Pa to 10 Pa is sufficient.

The metal layer surfaces subjected to sputter etching can be roll-bonded to each other. A line pressure load for roll bonding is not particularly limited. For example, a line pressure load can be adjusted within a range of 0.1 tf/cm to 10 tf/cm. When a diameter of a pressure roll is 100 mm to 250 mm, for example, a line pressure load for roll bonding is more preferably 0.1 tf/cm to 3 tf/cm, and further preferably 0.3 tf/cm to 1.8 tf/cm. When a roll diameter is increased or the metal layers are thick before bonding, however, it is occasionally necessary to increase a line pressure load to maintain a pressure that is necessary at the time of bonding, and the line pressure load is not limited to the level described above. When a line pressure load is excessively high, in contrast, the bonding interface is likely to be deformed in addition to the metal layer surface. This may deteriorate thickness accuracy of each metal layer of the roll-bonded laminate. When a line pressure load is high, in addition, work strain occurring at the time of bonding is increased, and Vickers hardness is likely to be elevated after bonding. In order to maintain thickness accuracy, it is preferable that a change in Vickers hardness of the hardest metal layer before and after bonding be within 80. When the metal layer is thick before bonding, for example, when it is 0.1 mm or more, thickness accuracy of each metal layer can be maintained if a change in Vickers hardness is increased, for example, up to 80. Preferably, such change is within 60. When the metal layer is thin before bonding, for example, when it is less than 0.1 mm, thickness accuracy of a metal layer is more closely related to a change in Vickers hardness. Accordingly, a change is preferably within 50, and more preferably within 40. When a layer is thin, the influence of the underlying metal is increased if measurement is carried out at a high load. In the present invention, accordingly, Vickers hardness is measured at 50 gf.

A rolling reduction at the time of roll bonding is not particularly limited, provided that a rolling reduction $\Delta T$ measured in the final form of the roll-bonded laminate is within a given range. It is preferably 8% or lower, and further preferably 6% or lower. It is not necessary that thickness is changed before and after roll bonding. Thus, the lower limit of the rolling reduction is 0%.

Roll bonding is preferably carried out in the non-oxidizing atmosphere, such as in an inert gas atmosphere (e.g., Ar), so as to prevent oxygen from being readsorbed onto the metal layer surface and to prevent the bonding strength therebetween from lowering.

The roll-bonded laminate composed of 2 or more layers obtained by roll bonding can be further subjected to thermal treatment, according to need. As a result of thermal treatment, work strain can be eliminated from metal layers, and adhesion between layers can be improved. When thermal treatment is conducted at high temperature for a long period of time, an intermetallic compound is generated at the interface, and adhesion (peel strength) is deteriorated. Thus, thermal treatment should be carried out under adequate conditions. In the case of a roll-bonded laminate of SUS and copper, for example, thermal treatment is preferably carried out at 100° C. to 1050° C. for 10 minutes to 8 hours. In the case of a roll-bonded laminate of SUS and Al, thermal treatment is preferably carried out at 200° C. to 400° C. for 5 minutes to 8 hours.

The roll-bonded laminate produced via surface-activated bonding described above can further be subjected to rolling (re-rolling), according to need. Thus, an expensive and thin roll-bonded laminate can be produced from a cost-effective thick original plate. In addition, materials can be conditioned by conditioning rolling. When re-rolling is carried out, a rolling reduction $\Delta T$ is measured in the form of a re-rolled laminate. Specifically, a difference between the total thickness $T_0$ of the 2 or more metal layers before bonding and thickness T of the roll-bonded laminate after re-rolling is a rolling reduction $\Delta T$.

Through the steps described above, a roll-bonded laminate composed of 2 or more layers can be obtained. The resulting roll-bonded laminate can be used in the form of a molded product, for example, a cover, a housing, a case, a reinforcement member, or a functional member such as a radiation/electromagnetic wave shield of various types of electronic equipment, such as mobile electronic equipment and PC, an electronic member for transportation means such as an automobile, or an electronic member for home appliance.

EXAMPLES

Hereafter, the present invention is described in greater detail with reference to the examples and comparative examples, although the scope of the present invention is not limited to these examples.

As Examples 1 to 13, roll-bonded laminates composed of 2 or 3 metal layers were prepared. In Example 14, a stainless steel plate with thickness of 102 μm was used as a reference example. The metal layers used in Examples 1 to 13 are as described below.

Example 1: 25 μm-thick SUS plate/52 μm-thick Cu plate/25 μm-thick SUS plate

Example 2: 50 μm-thick SUS plate/102 μm-thick Cu plate/50 μm-thick SUS plate

Example 3: 102 μm-thick SUS plate/204 μm-thick Cu plate/ 102 μm-thick SUS plate
Example 4: 102 μm-thick SUS plate/204 μm-thick Cu plate/ 102 μm-thick SUS plate
Example 5: 102 μm-thick SUS plate/204 μm-thick Cu plate/ 102 μm-thick SUS plate
Example 6: 50 μm-thick SUS plate/52 μm-thick Cu plate
Example 7: 201 μm-thick SUS plate/195 μm-thick Cu plate
Example 8: 15 μm-thick SUS plate/74 μm-thick Al plate/15 μm-thick SUS plate
Example 9: 51 μm-thick Al plate/198 μm-thick SUS plate/51 μm-thick Al plate
Example 10: 0.25 mm-thick SUS plate (SUS304)/0.8 mm-thick Al alloy plate (A5052)
Example 11: 200 μm-thick Cu plate (C1020)/200 μm-thick Al alloy plate (A5052)
Example 12: 200 μm-thick pure Ti plate (TP270)/600 μm-thick Al alloy plate (A5052)
Example 13: 200 μm-thick Ti alloy plate (Ti15-3-3)/600 μm-thick Al alloy plate (A5052)

When bonding these metal layers, the SUS plate, the Cu plate, the Al plate, the Al alloy plate, the pure Ti plate, and the Ti alloy plate were subjected to sputter etching. The SUS plate was subjected to sputter etching at $1\times10^{-4}$ Pa and a plasma output of 700 W for 10 minutes to 20 minutes. The Cu plate was subjected to sputter etching at $1\times10^{-4}$ Pa and a plasma output of 700 W for 10 minutes. The Al plate was subjected to sputter etching at $1\times10^{-4}$ Pa and a plasma output of 700 W for 20 minutes. The Al alloy plate was subjected to sputter etching at $1\times10^{-4}$ Pa and a plasma output of 700 W for 20 minutes. The pure Ti plate was subjected to sputter etching at $1\times10^{-4}$ Pa and a plasma output of 700 W for 20 minutes. The Ti alloy plate was subjected to sputter etching at $1\times10^{-4}$ Pa and a plasma output of 700 W for 20 minutes. After the sputter etching treatment, metal layers were roll-bonded to each other at room temperature with a roll diameter of 130 mm to 180 mm and a line pressure load of 0.5 tf/cm to 1.5 tf/cm. A rolling reduction achieved by surface-activated bonding is 0%. In Table 1, "S," "C," "A," "AA," "T," and "TA" represent stainless steel, copper, aluminum, aluminum alloy, titanium, and titanium alloy, respectively.

Figure 2:
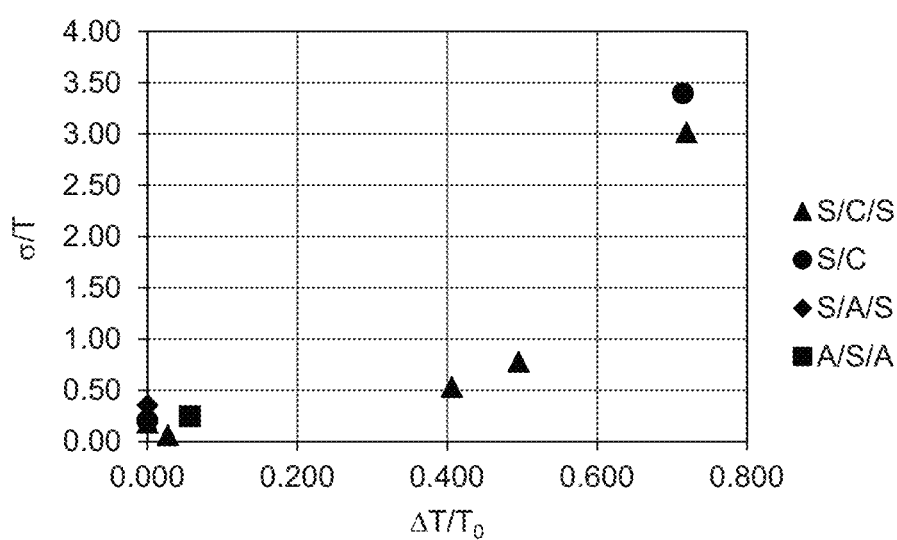
FIG. 2 shows a chart demonstrating the correlation between $\Delta T/T_0$ and $\sigma/T$.

The metal layers of Examples 2 to 4 and Example 7 were subjected to surface-activated bonding and then to rolling (re-rolling) to a rolling reduction of 50% to 75%. The metal layers of Example 1, Example 5, Example 6, and Examples 8 to 13 are not subjected to re-rolling. The metal layers of Examples 2 to 4 and Example 7 were subjected to thermal treatment at 1000° C. to 1050° C. in the end, and the bi-layer or tri-layer roll-bonded laminates according to Examples 1 to 13 were thus produced. Table 1 summarizes the total thickness $T_0$ of metal layers before bonding, the final thickness T, the rolling reduction $\Delta T$, $\Delta T/T_0$, the standard deviation σ of outermost layer thicknesses, and deviations of measured values from the average thickness T (the minimal deviation and the maximal deviation) concerning the roll-bonded laminates of Examples 1 to 13 and the stainless steel plate of Example 14. Table 1 also shows Vickers hardness values (JIS Z 2244; load: 50 gf) of the hardest layer among metal layers constituting the roll-bonded laminate before and after bonding. When Vickers hardness was to be measured before bonding, the target of measurement was mounted on the metal layer to be roll-bonded to the target because a metal layer is thin. Among the stainless steel plate, the copper plate, the aluminum plate, the aluminum alloy plate, the pure titanium plate, and the titanium alloy plate, the stainless steel plate and the titanium alloy plate are the hardest, followed by the pure titanium plate, the copper plate, and the aluminum plate in a descending order. FIG. 2 shows the correlation between $\Delta T/T_0$ and σ/T of each roll-bonded laminate. As is apparent from Table 1 and FIG. 2, two metal layers are bonded to each other while adjusting a change in Vickers hardness of the hardest metal layer of the 2 metal layers within 80 before and after bonding and the ratio $\Delta T/T_0$ of the rolling reduction $\Delta T$ relative to the total thickness $T_0$ of the metal layers before bonding to less than 1.0. Thus, a roll-bonded laminate exhibiting the ratio σ/T of the standard deviation σ of outermost layer thicknesses to thickness T of 4.0% or less can be obtained (Examples 1 to 13).

TABLE 1

| Ex. | Constitution | Designation | Rolling reduction (%) | Total thickness $T_0$ (μm) | Thickness T (after bonding) (μm) | Rolling reduction ($\Delta T$) | $\Delta T/T_0$ | Standard deviation of outermost layer thickness σ (μm) | σ/T | Minimal deviation of thickness T (%) | Maximal deviation of thickness T (%) | Hard layer before bonding | Hard layer after bonding | Change |
|---|---|---|---|---|---|---|---|---|---|---|---|---|---|---|
| 1 | S/C/S | 0.1 | 0% | 102 | 102 | 0 | 0.000 | 0.190 | 0.19 | 1.270 | 1.660 | 144.3 | 182.0 | 37.7 |
| 2 | S/C/S | 0.2→0.1 | 50% | 202 | 120 | 82 | 0.406 | 0.644 | 0.53 | 0.830 | 2.500 | — | — | — |
| 3 | S/C/S | 0.4→0.2 | 50% | 406 | 205 | 201 | 0.495 | 1.595 | 0.78 | 0.570 | 0.890 | 216.3 | 370.0 | 153.7 |
| 4 | S/C/S | 0.4→0.1 | 75% | 406 | 114 | 292 | 0.719 | 3.437 | 3.02 | 1.140 | 2.360 | 216.3 | 370.0 | 153.7 |
| 5 | S/C/S | 0.4 | 0% | 406 | 395 | 11 | 0.027 | 0.247 | 0.06 | 0.400 | 0.360 | 216.3 | 380.0 | 50.4 |
| 6 | S/C | 0.1 | 0% | 102 | 102 | 0 | 0.000 | 0.212 | 0.21 | 1.170 | 0.780 | — | — | — |
| 7 | S/C | 0.4→0.1 | 75% | 396 | 113 | 283 | 0.715 | 3.841 | 3.40 | 0.880 | 0.880 | — | — | — |
| 8 | S/A/S | 0.1 | 0% | 104 | 104 | 0 | 0.000 | 0.371 | 0.36 | 1.700 | 0.220 | 194.3 | 226.0 | 31.7 |
| 9 | A/S/A | 0.3 | 0% | 300 | 283 | 17 | 0.057 | 0.697 | 0.25 | 0.750 | 0.660 | 201.7 | 236.7 | 35.0 |
| 10 | S/AA | 0.97 | 9% | 1070 | 972 | 98 | 0.092 | 0.869 | 0.09 | 0.223 | 0.189 | 182.0 | 282.2 | 100.2 |
| 11 | C/AA | 0.4 | 5% | 395 | 375 | 20 | 0.051 | 0.936 | 0.25 | 0.622 | 0.178 | — | — | — |
| 12 | T/AA | 1 | 14% | 1000 | 860 | 140 | 0.140 | 0.849 | 0.10 | 0.229 | 0.120 | — | — | — |
| 13 | TA/AA | 1 | 10% | 1100 | 990 | 110 | 0.100 | 0.978 | 0.10 | 0.148 | 0.155 | — | — | — |
| 14 | SUS | 0.1 | 0% | 102 | 102 | 0 | 0.000 | — | — | 1.080 | 1.860 | — | — | — |

Figure 3:
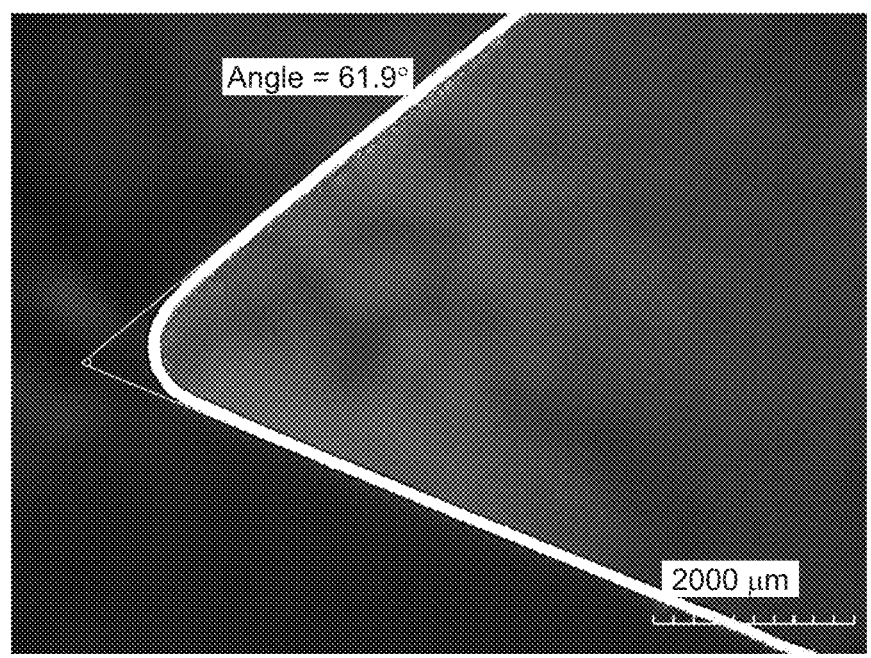
FIG. 3 shows an optical microscopic photograph (50×) of the roll-bonded laminate subjected to bending work by the V-block method.
Figure 4:
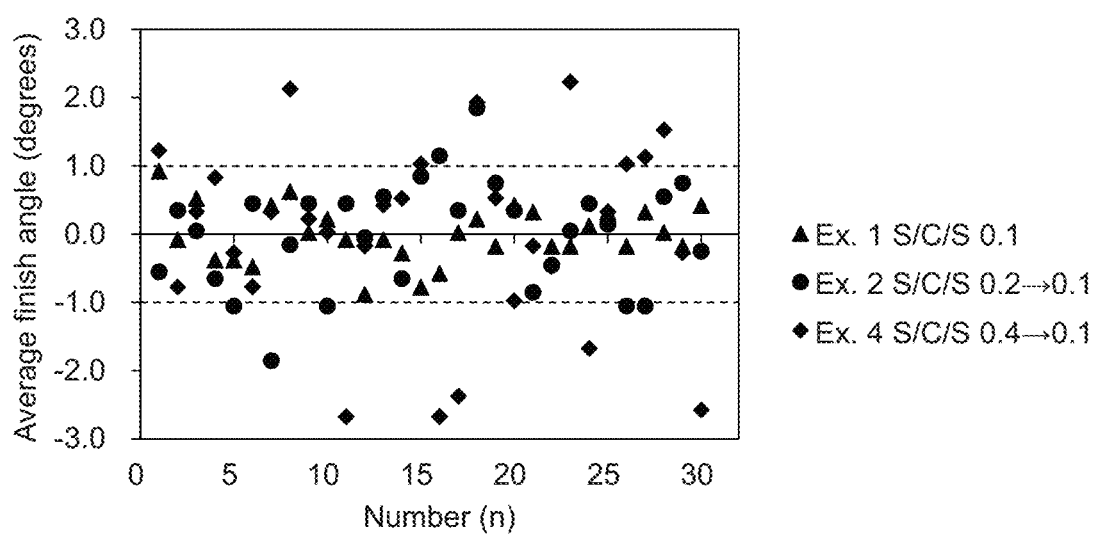
FIG. 4 shows a chart demonstrating a distribution of deviation from the average finish angle of the roll-bonded laminates of Examples 1, 2, and 4.
Figure 5:
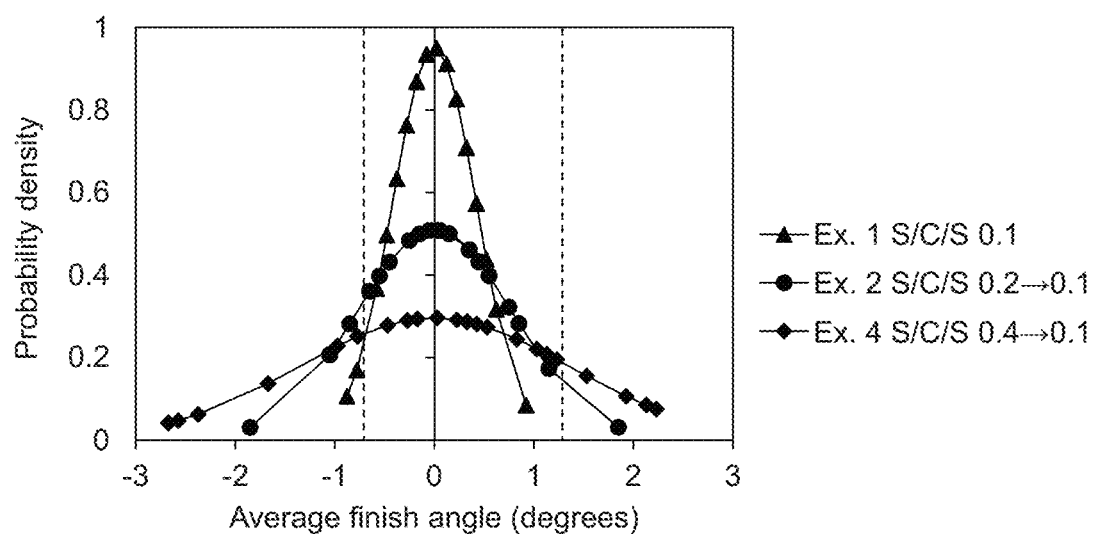
FIG. 5 shows a chart demonstrating a correlation between the deviation from the average finish angle and the probability density of the roll-bonded laminates of Examples 1, 2, and 4.
Figure 6:
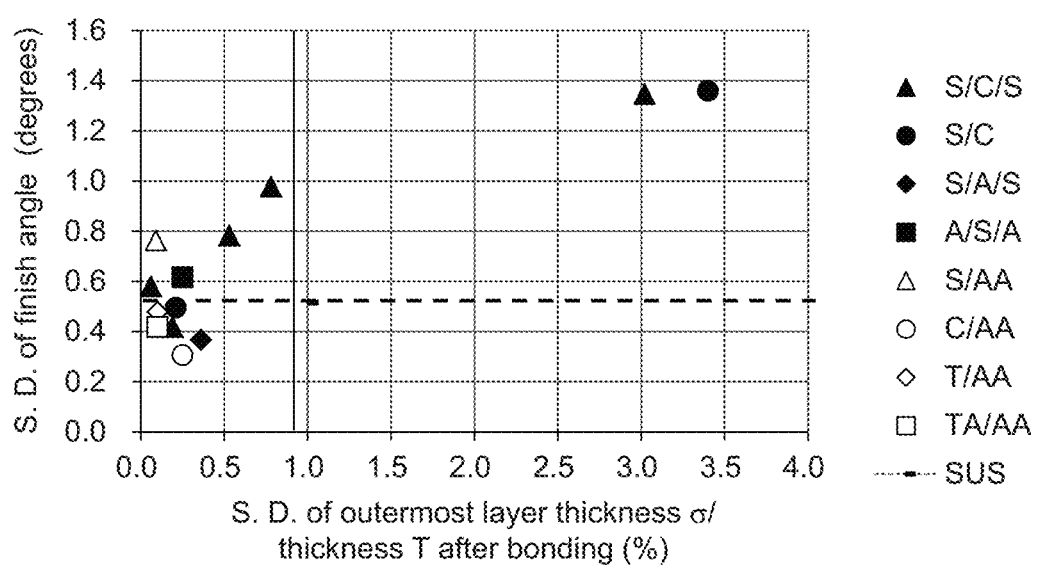
FIG. 6 shows a chart demonstrating a correlation between $\sigma/T$ and the standard deviation from the finish angle.
Figure 7:
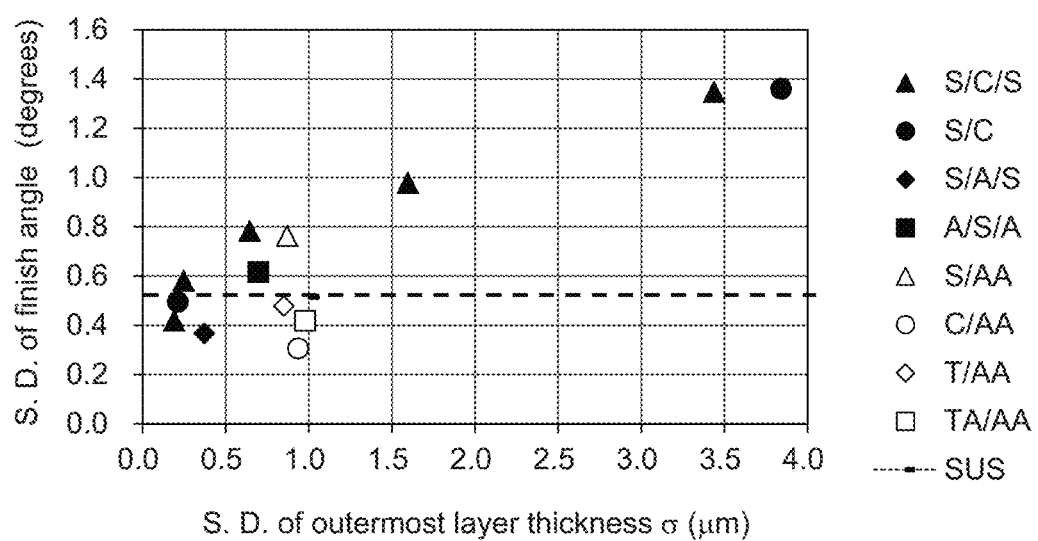
FIG. 7 shows a chart demonstrating a correlation between $\sigma$ and the standard deviation from the finish angle.

Subsequently, the roll-bonded laminates or the stainless steel plate of Examples 1 to 14 were bent by a V-block method (a die angle: 60°; a pressing tool with R of 0.5; a load of 1 kN; test material width of 10 mm; JIS Z 2248), and the finish angle after bending work was measured. FIG. 3 shows an optical microscopic photograph of the roll-bonded laminate subjected to bending work. Thirty samples each were subjected to measurement Table 2 shows the results of measurement. FIG. 4 and FIG. 5 each show a distribution of deviation from the average finish angle concerning the roll-bonded laminates of Examples 1, 2, and 4. FIG. 6 shows the correlation between σ/T and the standard deviation of the finish angle concerning Examples 1 to 14. FIG. 7 shows the correlation between σ and the standard deviation of the finish angle concerning Examples 1 to 14. As is apparent from the results shown in FIGS. 4 to 7, the standard deviation of the finish angle of the roll-bonded laminates of Examples 1 to 13 exhibiting a σ/T value of 4.0% or less can be regulated within 1.4 degrees. That is, such roll-bonded laminates exhibited high dimensional accuracy. In particular, the standard deviation of the finish angle of the roll-bonded laminates of Examples 1 to 3, 5, 6, and 8 to 13 exhibiting a σ/T value of 0.9% or less was regulated within 1 degree. That is, such roll-bonded laminates exhibited higher dimensional accuracy. When the a value was less than 4.0 μm, the standard deviation of the finish angle was found to be regulated within 1 degree (FIG. 7).

TABLE 2

| Ex. | Constitution | Designation | Results of bend working accuracy measurement | |
|---|---|---|---|---|
| | | | Average finish angle (degrees) | Standard deviation of finish angle (degrees) |
| 1 | S/C/S | 0.1 | 63.1 | 0.419 |
| 2 | S/C/S | 0.2→0.1 | 60.9 | 0.783 |
| 3 | S/C/S | 0.4→0.2 | 59.2 | 0.978 |
| 4 | S/C/S | 0.4→0.1 | 60.6 | 1.348 |
| 5 | S/C/S | 0.4 | 59.6 | 0.581 |
| 6 | S/C | 0.1 | 62.7 | 0.495 |
| 7 | S/C | 0.4→0.1 | 58.8 | 1.360 |
| 8 | S/A/S | 0.1 | 66.5 | 0.367 |
| 9 | A/S/A | 0.3 | 60.5 | 0.616 |
| 10 | S/AA | 0.97 | 61.7 | 0.763 |
| 11 | C/AA | 0.4 | 63.2 | 0.306 |
| 12 | T/AA | 1 | 60.7 | 0.479 |
| 13 | TA/AA | 1 | 62.3 | 0.418 |
| 14 | SUS | 0.1 | 61.7 | 0.516 |

DESCRIPTION OF NUMERAL REFERENCES

1: Roll-bonded laminate
t1: Outermost layer thickness
T: Roll-bonded laminate thickness All publications, patents, and patent applications cited herein are incorporated herein by reference in their entirety.

We claim:

1. A roll-bonded laminate, comprising:
two or more metal layers roll-bonded to each other, wherein an outermost layer of the two or more metal layers is selected from a group consisting of Al, an Al alloy, Cu, a Cu alloy, Mg, an Mg alloy, Ti, a Ti alloy, or SUS,
wherein a ratio σ/T of a standard deviation σ of an outermost layer thicknesses to a thickness T of the roll-bonded laminate is 0% to 1.2%, and
wherein the thickness T is 2 mm or less, and a deviation of the thickness T is 4.0% or less.

2. The roll-bonded laminate according to claim 1, wherein the standard deviation σ of the outermost layer thicknesses is less than 4.0 μm.

3. The roll-bonded laminate according to claim 1, wherein the two or more metal layers each independently comprise a metal selected from the group consisting of Al, an Al alloy, Cu, a Cu alloy, Mg, an Mg alloy, Ti, a Ti alloy, or SUS.

4. A method for producing the roll-bonded laminate according to claim 1, comprising:
bonding the two or more metal layers to each other so as to adjust a change in Vickers hardness of a hardest metal layer among the two or more metal layers before and after bonding within 80, wherein a ratio ΔT/T0 of a reduction ΔT to a total thickness T0 of the two or more metal layers before bonding is less than 1.0.

5. The method for producing the roll-bonded laminate according to claim 4, wherein bonding the two or more metal layers to each other is performed by subjecting metal layer surfaces to be bonded to each other to sputter etching and roll-bonding the metal layer surfaces subjected to the sputter etching.

6. A molded product comprising the roll-bonded laminate according to claim 1.

7. The roll-bonded laminate according to claim 2, wherein the two or more metal layers each independently comprise a metal selected from the group consisting of Al, an Al alloy, Cu, a Cu alloy, Mg, an Mg alloy, Ti, a Ti alloy, or SUS.

8. A molded product comprising the roll-bonded laminate according to claim 2.

9. A molded product comprising the roll-bonded laminate according to claim 3.

10. A molded product comprising the roll-bonded laminate according to claim 7.

11. The roll-bonded laminate according to claim 1, wherein the standard deviation σ is less than 1.8 μm.

* * * * *

UNITED STATES PATENT AND TRADEMARK OFFICE
CERTIFICATE OF CORRECTION

| | |
|---|---|
| PATENT NO. | : 11,453,203 B2 |
| APPLICATION NO. | : 16/483623 |
| DATED | : September 27, 2022 |
| INVENTOR(S) | : Kota Sadaki et al. |

It is certified that error appears in the above-identified patent and that said Letters Patent is hereby corrected as shown below:

On the Title Page

Please add "Tokyo (JP)" to the following line:
(73) Assignee: TOYO KOHAN CO., LTD., Tokyo (JP)

Signed and Sealed this
Twenty-seventh Day of December, 2022

Katherine Kelly Vidal
*Director of the United States Patent and Trademark Office*